United States Patent [19]

Wakizaka et al.

[11] Patent Number: 4,902,349

[45] Date of Patent: Feb. 20, 1990

[54] ASPHALT/POLYOL EMULSION AND PROCESS FOR PREPARATION THEREOF

[75] Inventors: Saburo Wakizaka; Hiraku Hayasaka; Kazuki Hashimoto; Kentaro Shiojiri; Toshiaki Suzuki, all of Tokyo, Japan

[73] Assignee: Toa Dora Kogyo Co., Ltd., Tokyo, Japan

[21] Appl. No.: 100,097

[22] Filed: Sep. 21, 1987

[51] Int. Cl.$^4$ ............................................. C08L 95/00
[52] U.S. Cl. ................................. 106/277; 106/273.1; 106/278; 252/311.5
[58] Field of Search ............... 106/277, 278, 273 R, 106/279, 273.1; 252/311.5

[56] References Cited

U.S. PATENT DOCUMENTS

| | | | |
|---|---|---|---|
| 2,714,582 | 8/1955 | Day | 106/277 |
| 3,340,203 | 9/1967 | Ferm | 106/277 |
| 3,575,932 | 4/1971 | Hedge | 208/44 |
| 3,594,202 | 7/1971 | Corbett et al. | 106/278 |
| 3,740,344 | 6/1973 | Ferm | 106/277 |
| 3,831,382 | 8/1974 | Califano et al. | 106/277 |
| 3,859,227 | 1/1975 | Dwyer | 106/277 |
| 3,891,586 | 6/1975 | Califano et al. | 106/277 |
| 4,041,712 | 8/1977 | Stepier, Jr. et al. | 106/277 |
| 4,293,459 | 10/1981 | Detroit | 106/277 |
| 4,405,375 | 9/1983 | Gibson et al. | 106/277 |

FOREIGN PATENT DOCUMENTS 139592  2/1960  U.S.S.R. ............... 106/277

OTHER PUBLICATIONS

McCutcheon's Emulsifiers & Detergents, North Amercian Edition, 1982, pp. 172 and 265.

Primary Examiner—Paul Lieberman
Assistant Examiner—Helene Klemanski
Attorney, Agent, or Firm—E. Lieberstein

[57] ABSTRACT

An asphalt/polyol emulsion is prepared from asphalt and polyol which are mixed and emulsified with a surface active agent and the plasticizer, by utilizing the behavior of a plasticizer according to the polymer solution theory and the surface-modifying effect of the plasticizer according to the surface chemistry.

15 Claims, No Drawings

ASPHALT/POLYOL EMULSION AND PROCESS FOR PREPARATION THEREOF

BACKGROUND OF THE INVENTION

The present invention relates to an asphalt/polyol emulsion to be used as a water-proofing material, a floor material and the like in various fields, and a process for the preparation of this asphalt/polyol emulsion.

In general, asphalt is often used as a material for the production of a water-proofing material, a floor material and the like. The reason is that asphalt is much cheaper than other polymeric substances, has a very strong binding force and is excellent in water-proofness, softness, water resistance and chemical resistance. However, asphalt is poor in the resistance to high temperature, and because of this defect, asphalt is used only in the civil engineering and construction industry.

The demand for asphalt is great in the civil engineering and construction industry, but in other industrial fields, the consumption of asphalt is very small because asphalt is softened at a high temperature as pointed out above and the coating strength is low.

Accordingly, modification of asphalt with a polymeric substance has been recently considered. For example, urethanized asphalt can be mentioned, and an asphalt/polyol emulsion can be mentioned as the material of urethanized asphalt.

As the urethanized asphalt, there can be mentioned a product formed by impregnating a urethane foam with an asphalt emulsion or cutback asphalt, and a urethanized asphalt foam obtained by mixing a polyol, an isocyanate and an asphalt emulsion and causing a chemical reaction in the mixture.

In view of the water-proofness of urethanized asphalt as described above, non-foamed urethanized asphalt is preferred. However, in order to obtain non-foamed urethanized asphalt, it is necessary to control generation of a gas in the urethane-forming chemical reaction by some means or other.

An isocyanate and a polyol are considered as the prepolymer of polyurethane. There is a technique of forming an emulsion of asphalt and an isocyanate, but a very strict quality control is necessary for this emulsion. Namely, the kind of asphalt that can be used is restricted and very strict previous check is necessary for asphalt.

It is considered that such a strict quality control as that described above will not be necessary for an emulsion of asphalt and a polyol. However, mixing of asphalt with a polyol is generally difficult, and even if softened asphalt (cutback asphalt) is mixed with a polyol, asphalt separates from the polyol because of a poor compatibility, and even if asphalt is dispersed in the polyol with the aid of a surface active agent, phase separation is caused in a short time.

SUMMARY OF THE INVENTION

In accordance with this invention, an asphalt/polyol emulsion is prepared from asphalt and polyol which are mixed and emulsified with a surface active agent and the plasticizer. This new emulsion is prepared by utilizing the behavior of a plasticizer according to the polymer solution theory and the surface-modifying effect of the plasticizer according to the surface chemistry.

More particularly, a surface active agent having an HLB value of about 13 to about 18 is added to a polyol heated at about 50° C. in an amount of 1.5 to 6.0% by weight based on asphalt. A non-ionic or anionic surface active agent is preferred. When a mixture comprising a surface active agent having an HLB value of about 13 and a surface active agent having an HLB value of about 18 at a weight ratio of 1/1 is used, the stability of the final emulsion is especially highly improved.

The so-formed polyol solution is mixed with asphalt heated so that the viscosity is 100 to 200 cP, by means of an emulsifying machine such as a colloid mill or a homogenizer, so that the asphalt concentration is 30 to 65% by weight, whereby the asphalt is emulsified or dispersed.

Subsequently, a selected plasticizer is added to the mixture in an amount of 2.5 to 15 % by weight based on the asphalt. The amount of the plasticizer added is determined according to the kind of the asphalt. A plasticizer having an adequate polarity and a higher molecular weight is capable of strongly absorbing polar groups of the surface active agent.

This asphalt/polyol mixture has a temperature of 80° to 90° C. just after the preparation, but if the temperature is lowered to about 30° to about 40° C., separation of the asphalt and polyol is initiated. Accordingly, a predetermined amount of the abovementioned plasticizer is added before the temperature is lowered to about 50° C. where the separation is not initiated yet, and the mixture is stirred at about 400 rpm to obtain a product.

The so-prepared asphalt/polyol emulsion is used as the material with an isocyanate or the like as a reactant for the production of a water-proofing material, a floor material and the like in various industrial fields.

Accordingly it is an object of the present invention to provide an asphalt/polyol emulsion which emulsion state is stable at normal temperature.

It is further object of the invention to provide an asphalt/ polyol emulsion which has high strength in coating and its coating is not readily softened at a high temperature.

DETAILED DESCRIPTION

An example of the present invention will now be described.

An asphalt/polyol emulsion was prepared according to the following recipe.

| | |
|---|---|
| Asphalt (straight asphalt 80/100) | 49.6% by weight |
| Polyol (polypropylene glycol PPG-3000) | 40.0% by weight |
| Surface active agent (polyoxyethylene(9) nonylphenol HLB = 13.1) | 2.1% by weight |
| Surface active agent (polyoxyethylene(40) stearate, HLB = 16.9) | 2.7% by weight |
| Plasticizer (dioctyl phthalate) | 5.6% by weight |

The properties of the so-obtained emulsion are shown in Table 1.

TABLE 1

| Item | Property |
|---|---|
| Appearance | blackish brown liquid |
| Specific gravity (25° C./25° C.) | 1.010 |
| pH (20° C.) | 7.8 |
| Viscosity (cP, 20° C.) | 2450 |

According to the present inveiton described in detail hereinbefore, by dispersing an asphalt/polyol solution having a viscosity of 100 to 200 cP with an emulsifying machine, the surface active agent in the polyol is absorbed on the surfaces of asphalt particles (5 to 10μ). Namely, the oleophilic group of the surface active agent is absorbed on the asphalt surface, and the hydrophilic group of the surface active agent is oriented toward the polyol on the asphalt particles. However, with lowering of the temperature, the activity of the surface active agent is reduced and asphalt is separated from the polyol. Accordingly, a platicizer having a good compatibility with the polyol is used, and since the plasticizer has such a property that the plasticizer is absorbed in a portion having a high polarity, if the platicizer is added to the above-mentioned mixture, the plasticizer is absorbed in the hydrophilic group (polar portion) of the surface active agent, whereby asphalt is coated (surface-modified) with the plasticizer and is stably dispersed in the polyol.

Accordingly, the emulsion state of the asphalt/polyol emulsion of the present invention at normal temperature is very stable, and when the asphalt/polyol emulsion of the present invention is practically used as the product, the coating strength is very high and the coating is not readily softened even at a high temperature. Therefore, excellent effects can be attained according to the present invention.

What is claimed is:

1. An asphalt/polyol emulsion formed by emulsifying asphalt with an emulsion of a polyalkylene glycol and a mixture of at least one surface active agent and a plasticizer, with the proviso that the molecular weight of the polyalkylene glycol is such that the asphalt and glycol are immiscible, wherein the asphalt constitutes 30 to 65% by weight of the asphalt emulsion, the weight % of the mixture of surface active agent is 1.5-6% based on the weight of asphalt, the weight % of the plasticizer is 2.5 to 15% based on the weight of asphalt and the remainder is polyalkylene glycol.

2. An asphalt/polyol emulsion as set for the in claim 1, wherein the polyol is a polyether polyol or a polyester polyol.

3. An asphalt/polyol emulsion as set forth in claim 1, wherein the surface active agent has an HLB value of about 13 to about 18.

4. An asphalt/polyol emulsion as set forth in claim 1, wherein the plasticizer is a phthalate plasticizer.

5. A process for the preparation of an asphalt//polyol emulsion, which comprises adding a surface active agent to a heated polyalkylene glycol to form a polypropylene glycol solution, adding a plasticizer to the resulting mixture of asphalt and the polypropylene glycol solution while said mixture is still under such temperature condition that the asphalt and the polypropylene glycol solution in the mixture are not separated from each other, and stirring the obtained mixture, with the proviso that the molecular weight of the polyalkylene glycol is such that the asphalt and glycol are immiscible, wherein the asphalt constitutes 30 to 65% by weight of the asphalt emulsion. the weight % of the mixture of surface active agent is 1.5-6% based on the weight of asphalt, the weight % of the plasticizer is 2.5 to 15% based on the weight of asphalt and the remainder is polyalkylene glycol.

6. The emulsion claimed in claim 1 wherein the polyalkylene glycol is polypropylene glycol.

7. The emulsion claimed in 1 wherein the surface active agent has an HLB value of about 13 to about 18.

8. The emulsion claimed in claim 1 wherein the surface active agent is non-ionic or anionic.

9. The emulsion claimed in claim 1 wherein two surface active agents are used.

10. The emulsion claimed in claim 9 wherein the weight ration of surface active agents is about 1:1.

11. The emulsion claimed in claim 1 having the composition:

| Asphalt | 49.6% by weight |
| Polypropylene glycol | 40.0% by weight |
| Polyethylene nonyl phenol | 2.1% by weight |
| Polyethylene staerate | 2.7% by weight |
| Dioctyl phthalate | 5.6% by weight. |

12. The process claimed in claim 5 wherein the polyalkylene glycol solution is formed at a temperature of about 80°-90° C. and the plasticizer is added above a temperature of about 50° C.

13. The process claimed in claim 5 wherein the polyalkylene glycol is polypropylene glycol having a molecular weight of about 3000.

14. The process claimed in claim 5 wherein two surface active agents are added.

15. The process claimed in claim 5 wherein the emulsion obtained has the composition:

| Asphalt | 49.6% by weight |
| Polypropylene glycol | 40.0% by weight |
| Polyethylene nonyl phenol | 2.1% by weight |
| Polyethylene staerate | 2.7% by weight |
| Dioctyl phthalate | 5.6% by weight. |

* * * * *